(12) United States Patent
Cacheaux (10) Patent No.: US 12,306,699 B2
(45) Date of Patent: *May 20, 2025

(54) SYSTEMS, APPARATUSES, AND METHODS FOR ASSESSING RECOVERY VIABILITY OF BACKUP DATABASES

(71) Applicants: ATLASSIAN PTY LTD., Sydney (AU); ATLASSIAN US, INC., San Francisco, CA (US)

(72) Inventor: Rene Cacheaux, Austin, TX (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/540,990

(22) Filed: Dec. 15, 2023

(65) Prior Publication Data

US 2024/0231978 A1 Jul. 11, 2024

Related U.S. Application Data

(63) Continuation of application No. 17/657,463, filed on Mar. 31, 2022, now Pat. No. 11,886,277.

(51) Int. Cl.
*G06F 11/00* (2006.01)
*G06F 11/14* (2006.01)
*G06F 16/26* (2019.01)

(52) U.S. Cl.
CPC ........ *G06F 11/008* (2013.01); *G06F 11/1451* (2013.01); *G06F 11/1458* (2013.01); *G06F 16/26* (2019.01)

(58) Field of Classification Search
CPC . G06F 11/008; G06F 11/1451; G06F 11/1458
USPC ...................................... 714/38.1, 20, 21, 15
See application file for complete search history.

(56) References Cited

U.S. PATENT DOCUMENTS

| 2004/0260678 | A1 | 12/2004 | Verbowski et al. |
| 2011/0087874 | A1 | 4/2011 | Timashev et al. |
| 2013/0212437 | A1* | 8/2013 | Timashev ........... G06F 11/1448 714/37 |

(Continued)

FOREIGN PATENT DOCUMENTS

CN 114586031 A 6/2022

*Primary Examiner* — Chae M Ko
(74) *Attorney, Agent, or Firm* — ALSTON & BIRD LLP (57) ABSTRACT

Apparatuses and methods for assessing the recovery viability of backup databases are provided. Some embodiments may include identifying a selected backup database set from the plurality of backup databases. In some embodiments, each backup database in the selected backup database set is associated with a database in a corresponding database set. Some embodiments may include triggering a first backup configuration check operation for each database in the corresponding database set. Some embodiments may include triggering a restore verification operation for each database in the selected backup database set. Some embodiments may include generating a recovery point objective score for each database in the selected backup database set. Some embodiments may include causing updating of a recovery point objective score interface based on the recovery point objective score for each database in the selected backup database set.

20 Claims, 5 Drawing Sheets

(56) References Cited

U.S. PATENT DOCUMENTS

| | | | |
|---|---|---|---|
| 2014/0215265 A1* | 7/2014 | Mohanta | G06F 11/1448 |
| | | | 714/15 |
| 2016/0188415 A1 | 6/2016 | Karinta et al. | |
| 2020/0099575 A1* | 3/2020 | Jan | H04L 41/145 |
| 2021/0034470 A1 | 2/2021 | Ishizu et al. | |
| 2021/0117549 A1 | 4/2021 | Mandagere et al. | |

* cited by examiner

SYSTEMS, APPARATUSES, AND METHODS FOR ASSESSING RECOVERY VIABILITY OF BACKUP DATABASES

CROSS-REFERENCE TO RELATED APPLICATIONS

This application is a continuation of and claims priority to U.S. application Ser. No. 17/657,463, filed Mar. 31, 2022, the contents of which are incorporated by reference in its entirety.

TECHNICAL FIELD

Embodiments of the present disclosure relate generally to computer technology and, more particularly, relate to assessing the recovery viability of backup databases.

BACKGROUND

Applicant has identified a number of deficiencies and problems associated with present systems, methods, and computer program products for managing backup databases. Through applied effort, ingenuity, and innovation, many of these identified problems have been solved by developing solutions that are included in embodiments of the present disclosure, many examples of which are described in detail herein.

BRIEF SUMMARY

Embodiments of the present disclosure relate to systems, apparatuses, and methods for assessing recovery viability for a plurality of backup databases. In example embodiments, an apparatus configured for assessing recovery viability for a plurality of backup databases includes at least a processor, and a memory associated with the processor having computer coded instructions therein, with the computer coded instructions configured to, when executed by the processor, cause the apparatus to identify a selected backup database set from the plurality of backup databases, wherein each backup database in the selected backup database set is associated with a database in a corresponding database set. In embodiments, the apparatus comprising at least a processor, and a memory associated with the processor having computer coded instructions therein, with the computer coded instructions configured to, when executed by the processor, cause the apparatus to select a first backup configuration check operation from a plurality of backup configuration check operations based on the corresponding database set. In embodiments, the apparatus comprising at least a processor, and a memory associated with the processor having computer coded instructions therein, with the computer coded instructions configured to, when executed by the processor, cause the apparatus to trigger the first backup configuration check operation for each database in the corresponding database set. In embodiments, the apparatus comprising at least a processor, and a memory associated with the processor having computer coded instructions therein, with the computer coded instructions configured to, when executed by the processor, cause the apparatus to trigger a restore verification operation for each database in the selected backup database set. In embodiments, the apparatus comprising at least a processor, and a memory associated with the processor having computer coded instructions therein, with the computer coded instructions configured to, when executed by the processor, cause the apparatus to generate a recovery point objective score for each database in the selected backup database set, wherein the recovery point objective score is determined based on the first backup configuration check operation and the restore verification operation. In embodiments, the apparatus comprising at least a processor, and a memory associated with the processor having computer coded instructions therein, with the computer coded instructions configured to, when executed by the processor, cause the apparatus to generate a recovery point objective score interface based on the recovery point objective score for each database in the selected backup database set.

In embodiments, the first backup configuration check operation produces a backup configuration check score for each database in the corresponding database set.

In embodiments, the apparatus comprising at least a processor, and a memory associated with the processor having computer coded instructions therein, with the computer coded instructions configured to, when executed by the processor, cause the apparatus to generate a backup configuration check interface based on the backup configuration check score for each database in the corresponding database set.

In embodiments, the restore verification operation produces a restore verification status score for each database in the selected backup database set.

In embodiments, the apparatus comprising at least a processor, and a memory associated with the processor having computer coded instructions therein, with the computer coded instructions configured to, when executed by the processor, cause the apparatus to generate a restore verification status interface based on the restore verification status score for each database in the selected backup database set.

In embodiments, the recovery point objective score is based on the backup configuration check score and the restore verification status score.

In embodiments, the corresponding database set comprises a first database type.

In embodiments, the first backup configuration check operation includes extracting metadata for each database in the corresponding database set. In embodiments, the first backup configuration check operation includes generating a database configuration metadata structure comprising a plurality of configuration records each representative of a configuration setting for a respective database, and each comprising a configuration value. In embodiments, the first backup configuration check operation includes parsing the database configuration metadata structure to identify whether the configuration value of each configuration record meets a pre-defined configuration value.

In embodiments, the apparatus comprising at least a processor, and a memory associated with the processor having computer coded instructions therein, with the computer coded instructions configured to, when executed by the processor, cause the apparatus to cause rendering of the recovery point objective score interface.

BRIEF DESCRIPTION OF THE DRAWINGS

Having thus described certain embodiments of the present disclosure in general terms, reference will now be made to the accompanying drawings, which are not necessarily drawn to scale, and wherein:

DETAILED DESCRIPTION

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

Overview

Various embodiments of the present disclosure generally relate to a backup database recovery viability system. Large distributed networks may include multiple different software applications. Each of these software applications may be supported by a variety of software services. For example, a software application (e.g., Jira® by Atlassian Pty. Ltd.) may be supported by a credentialing service in order to ensure security. In performing their functions, the software applications may rely on a variety of databases (e.g., Aurora, RDS, DynamoDB, and S3) in which the software applications may store generated data and read data that the software applications have previously stored in the databases.

For the software applications to operate effectively, it is critical that the databases relied upon by the software applications can be accurately recovered (e.g., the data in the databases has not been lost or altered). The risk of the software applications not being able to recover the databases can be mitigated through the use of backup databases that provide another source of the databases used by the software applications in the event that the databases cannot be recovered. However, the amount of risk mitigation provided by the backup databases is dependent upon how accurately the databases have been backed up to the backup databases.

For example, if an error occurs that prevents a database from being backed up to a backup database, a software application will not be able to recover the database from the backup database. As another example, if a database is only configured to be backed up to a backup database once per day, a software application will only be able to recover the database as it existed at the last backup. As another example, if a database is configured such that an administrator of the database can alter the database (either maliciously or inadvertently), a backup database may not include an accurate copy of the database.

As such, the inventors have determined that it is desirable to be able to assess the recovery viability of backup databases to ensure that software applications may be able to recover up to date and accurate copies of databases that have been backed up to the backup databases. Accordingly, a backup database recovery viability system and associated methods are provided that enable the assessment of the recovery viability of backup databases.

In some embodiments, the backup database recovery viability system may trigger a restore verification operation, in which a backup database is restored to a temporary restore database. If the temporary restore database is accessible (e.g., data can be read from the temporary restore database) it indicates that data has been properly backed up to the backup database. In some embodiments, the backup database recovery viability system may trigger a backup configuration check operation to determine if the configuration settings of the database are in compliance with pre-defined configurations set by the backup database recovery viability system. For example, the backup configuration check operation may determine if the database is backed up to the backup database at an appropriate interval (e.g., once per hour). In some embodiments, a recovery point objective score may be generated for each backup database based on the restore verification operation and the backup configuration check operation. The recovery point objective score may serve as an overall metric of the recovery viability of the backup databases. In some embodiments, the backup database recovery viability system may render a recovery point objective score interface from which a user can assess the recovery point objective score.

Definitions

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

As used herein, a "computer-readable storage medium," which refers to a physical storage medium (e.g., volatile or non-volatile memory device), may be differentiated from a "computer-readable transmission medium," which refers to an electromagnetic signal.

As used herein, the terms "user", "client", and/or "request source" refer to an individual or entity that is a source, and/or is associated with sources, of a request for messages and/or related content to be provided by a message objective control system and/or any other system capable of providing messages and/or related content to the individual and/or entity. For example, a "user" and/or "client" may be the owner and/or entity that seeks information and options associated with preparing and/or otherwise planning for one or more potential events.

As used herein, the term "database," "resource," and/or similar terms used herein interchangeable may refer to a collection of records or data that is stored in a computer-readable storage medium using one or more database types. As used herein, the term "database type" may refer to a type of database, such as a hierarchical database, network database, relational database (e.g., Aurora, RDS), entity-relationship database, object database (e.g., S3), document database, semantic database, graph database, non-SQL database (e.g., DynamoDB), and/or the like.

As used herein, the term "backup database" refers to a duplicate instance or copy of a database that serves to replicate the operational state, architecture, and stored data of the replicated database. In some embodiments, the backup database may be configured to copy the data stored in a duplicate database such that the stored data in the duplicate database may be accessed to support functions of an associated software application when the primary database is offline or otherwise no longer accessible.

As used herein, the term "restore verification operation" refers to a computer operation performed by the backup database recovery viability system for a backup database. In some embodiments, the restore verification operation may trigger the creation of a temporary restore database based on the backup database. In some embodiments, the restore verification operation may determine if the temporary restore database is accessible. For example, the temporary restore database is accessible if the data stored in the backup database can be read from the temporary restore database by the backup database recovery viability system. In some embodiments, if the temporary resource database is accessible, the restore verification operation may trigger the deletion of the temporary resource database. In some embodiments, the restore verification operation may produce a restore verification status score for the backup database. In some embodiments, the restore verification status score may be a pass score, a fail score, an acceptable score, or a not applicable score. In some embodiments, the restore verification status score for the backup database may be represented on a restore verification status interface. In some embodiments, the restore verification status interface may include charts, graphs, text, and/or the like that indicate if the restore verification status score is a pass score, a fail score, a not applicable score, or an acceptable score.

As used herein, the term "metadata" refers to data that describes other data. For example, metadata may summarize basic information about other data. As used herein, the term "database configuration metadata" refers to data representative of the configuration settings of a database. As used herein, the term "database configuration metadata structure" refers to a parse-able data structure comprising database configuration metadata, and the data structure comprises a plurality of configuration records.

As used herein, the term "configuration record" refers to a record representative of the configuration settings of a database. In some embodiments, the configuration record may include a configuration value for each configuration setting of a database.

As used herein, the term "backup configuration check operation" refers to a computer operation performed by the backup database recovery viability system for a database associated with a backup database. In some embodiments, the backup configuration check operation may trigger the extraction of metadata for a database associated with the backup database. In some embodiments, the backup configuration check operation may generate a database configuration metadata structure comprising a plurality of configuration records each representative of a configuration setting for a respective database and each comprising a configuration value. In some embodiments, the backup configuration check operation may parse the database configuration metadata structure to identify whether the configuration value of each configuration record meets a pre-defined configuration value.

For example, the configuration settings may include the frequency at which the database is configured to be backed up to a backup database. In some embodiments, the backup configuration check operation, may produce a backup configuration check score. The backup configuration check score may be a pass score, a fail score, or a not applicable score. In some embodiments, the backup configuration check score may be represented via a backup configuration check interface. In some embodiments, the backup configuration check interface may include charts, graphs, text, and/or the like that indicate if the backup configuration check score is a pass score, a fail score, or a not applicable score. As used herein, the term "recovery point objective score" refers to a score or metric for representing the recovery viability of a backup database.

In some embodiments, the recovery point objective score may be based on backup configuration check score and the restore verification status score. In some embodiments, the recovery point objective score may be a pass score, a fail score, a warning score, or an acceptable score. A pass score may indicate that both the restore verification status score and the backup configuration check score were a pass. A fail score may indicate that either or both of the restore verification status score and the backup configuration check score were a fail. A warning score may indicate that the restore verification status score was a bass and the backup configuration check score was not applicable. An acceptable score may indicate that the restore verification status score was acceptable and the backup configuration check score was a pass. In some embodiments, the recovery point objective score may be represented on a recovery point objective score interface. In some embodiments, the recovery objective score interface may include charts, graphs, text, and/or the like that indicate if the recovery point objective score is a pass score, a fail score, a warning score, or an acceptable score.

System Overview

Figure 1:
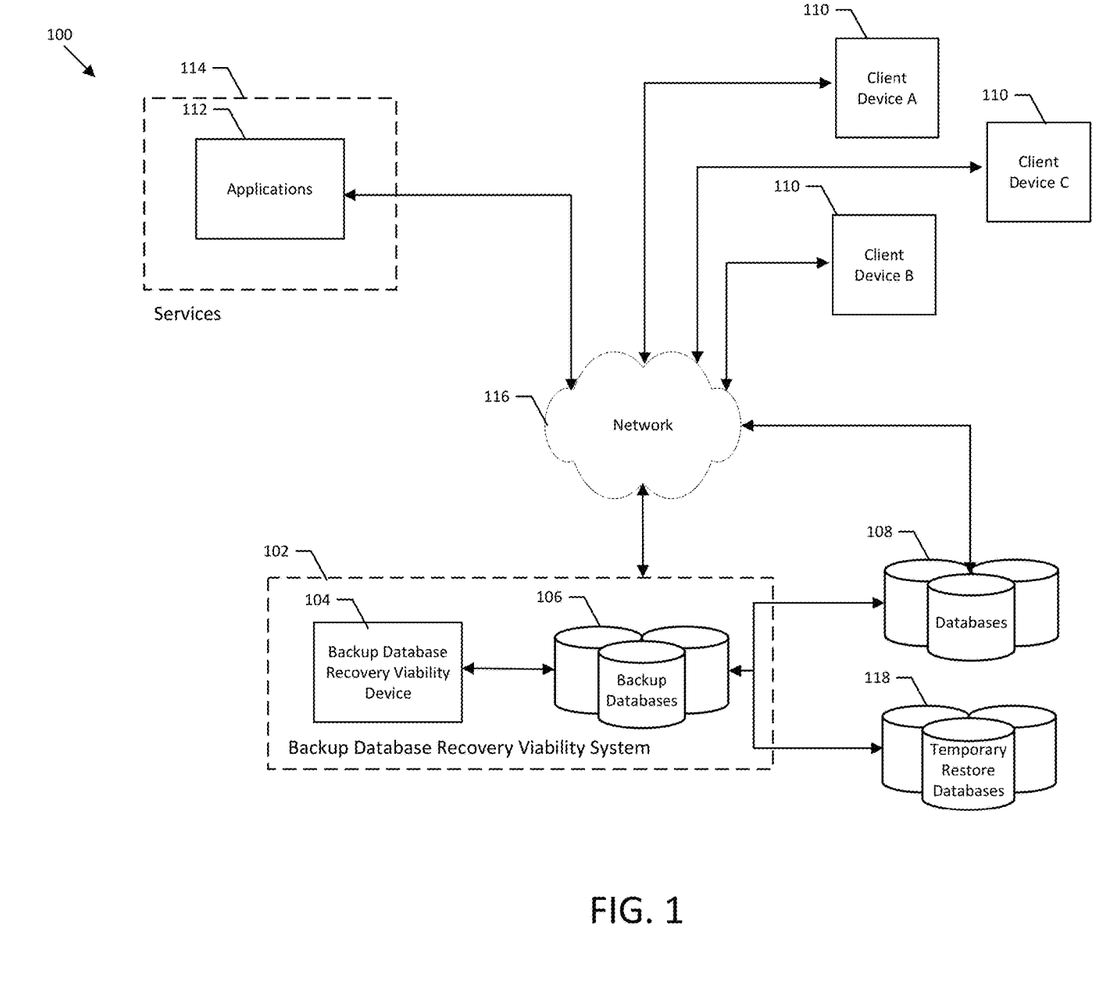
FIG. 1 illustrates a system for assessing the recovery viability of backup databases in accordance with one or more embodiments of the present disclosure.

FIG. 1 illustrates an example system 100 that includes a backup database recovery viability system 102. It will be appreciated that the system 100 as well as the illustrations in other figures are each provided as an example of an embodiment(s) and should not be construed to narrow the scope or spirit of the disclosure in any way. In this regard, the scope of the disclosure encompasses many potential embodiments in addition to those illustrated and described herein. As such, while FIG. 1 illustrates one example configuration of a system for assessing the recovery viability for a plurality of backup databases, numerous other configurations may also be used to implement embodiments of the present disclosure.

The system 100 may include a backup database recovery viability system 102 for assessing the recovery viability of backup databases. The backup database recovery viability system 102 may include a backup database recovery viability device 104, which may be configured to carry out the operations of the backup database recovery viability system 102 in accordance with one or more example embodiments disclosed herein. The backup database recovery viability device 104 may comprise one or more servers, a server cluster, one or more network nodes, a cloud computing infrastructure, one or more desktop computers, one or more laptop computers, one or more mobile computing devices some combination thereof, or the like.

The backup database recovery viability system 102 may include a plurality of backup databases 106. In some embodiments, the plurality of backup databases 106 may be configured to back up a plurality of databases 108 of the system 100. The plurality of databases 108, for example, may include one or more of Aurora, RDS, DynamoDB, or S3 type databases. In some embodiments, the system 100 may include a plurality of temporary restore databases 118. The plurality of temporary restore databases 118 may be used by the backup database recovery viability system 102 for assessing the recovery viability of backup databases. Although depicted as separate from the backup database recovery viability system 102 in FIG. 1, it would be understood by one skilled in the art in view of this disclosure that, in some embodiments, the plurality of temporary restore databases 118 may be a part of the backup database recovery viability system 102.

In some embodiments, the system 100 may include one or more client devices 110, For example, the system 100 may include Client Device A, Client Device B, and Client Device C. While three such client devices 110 are illustrated in FIG. 1, it will be appreciated that this illustration is by way of example, and not by way of limitation, as the system 100 may include additional client devices 110. The one or more client devices 110 may be embodied as any type of computing device, such as by way of non-limiting example, a cellular phone, smart phone, communication device, tablet computing device, digital camera/camcorder, audio/video player, digital video recorder, mouse, keyboard, router, laptop computing device, desktop computing device, wearable computing device, internet of things computing device, "smart" appliances (e.g., refrigerator, washer, or dryer with network connectivity), mobile computing device, any combination thereof, or the like.

In some embodiments, the system 100 may include one or more software applications 112. For example, the one or more software applications 112 may be Jira® by Atlassian Pty. Ltd. or Confluence® by Atlassian Pty. Ltd. In some embodiments, the system 100 may include one or more services 114 that support the one or more software applications 112. For example, a software application may be supported by a credentialing service in order to provide security. In some embodiments, the one or more software applications 112 together with the one or more services 114 may provide services to the one or more client devices 110.

In some embodiments, the one or more software applications 112 may read and write data to the plurality of databases 108 in order to facilitate the services provided to the client devices 110.

In some embodiments, the backup database recovery viability system 102, the plurality of databases 108, the one or more client devices 110, the one or more software applications 112, and/or the one or more temporary restore databases 118 may be configured to connect to one or more networks 116. For example, the backup database recovery viability system 102, the plurality of databases 108, the one or more client devices 110, and the one or more software applications 112 may be configured to access the network 116 via a cellular connection, wireless local area network connection, Ethernet connection, and/or the like. As such, the network 116 may comprise a wireline network, wireless network (e.g., a cellular network, wireless local area network, wireless wide area network, some combination thereof, or the like), or a combination thereof, and in some example embodiments comprises at least a portion of the Internet.

Figure 2:
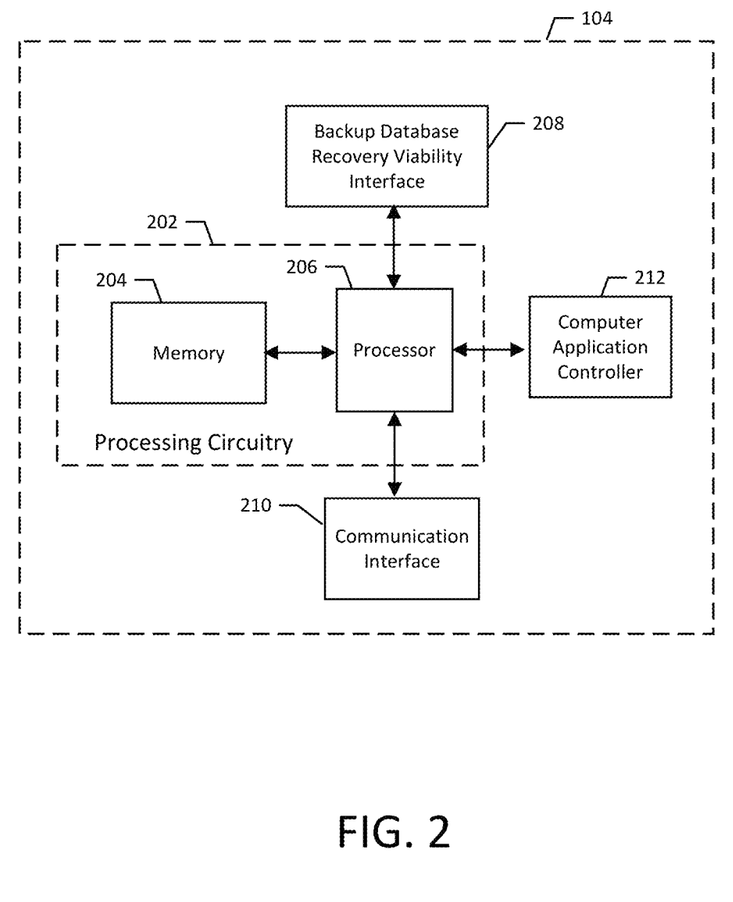
FIG. 2 illustrates a block diagram of a computing device in accordance with one or more embodiments of the present disclosure.

FIG. 2 illustrates a block diagram of the backup database recovery viability device 104 in accordance with some example embodiments. However, it should be noted that the components, devices or elements illustrated in and described with respect to FIG. 2 below may not be mandatory and thus some may be omitted in certain embodiments. Additionally, some embodiments may include further or different components, devices or elements beyond those illustrated in and described with respect to FIG. 2.

Referring now to FIG. 2, a block diagram of the backup database recovery viability device 104 is illustrated. The backup database recovery viability device 104 may be embodied as any computing device, such as by way of non-limiting example, a cellular phone, smart phone, communication device, tablet computing device, digital camera/camcorder, audio/video player, digital video recorder, mouse, keyboard, router, laptop computing device, desktop computing device, wearable computing device, internet of things computing device, "smart" appliances (e.g., refrigerator, washer, or dryer with network connectivity), mobile computing device, any combination thereof, any other devices whose location is capable of detection, or the like.

The backup database recovery viability device 104 may include or otherwise be in communication with processing circuitry 202 that is configurable to perform actions in accordance with one or more example embodiments disclosed herein. In this regard, the processing circuitry 202 may be configured to perform and/or control performance of one or more functionalities of the backup database recovery viability device 104 in accordance with various example embodiments, and thus may provide means for performing functionalities of the backup database recovery viability device 104 in accordance with various example embodiments. The processing circuitry 202 may be configured to perform data processing, application execution and/or other processing and management services according to one or more example embodiments. In some embodiments, the backup database recovery viability device 104 or a portion (s) or component(s) thereof, such as the processing circuitry 202, may be embodied as or comprise a chip or chip set. In other words, the backup database recovery viability device 104 or the processing circuitry 202 may comprise one or more physical packages (e.g., chips) including materials, components and/or wires on a structural assembly (e.g., a baseboard).

The structural assembly may provide physical strength, conservation of size, and/or limitation of electrical interaction for component circuitry included thereon. The backup database recovery viability device 104 or the processing circuitry 202 may therefore, in some cases, be configured to implement an embodiment of the disclosure on a single chip or as a single "system on a chip." As such, in some cases, a chip or chipset may constitute means for performing one or more operations for providing the functionalities described herein.

In some example embodiments, the processing circuitry 202 may include a processor 206 and, in some embodiments, such as that illustrated in FIG. 2 may further include memory 204. The processing circuitry 202 may be in communication with or otherwise control a backup database recovery viability interface 208, a communication interface 210, and/or a computer application controller 212. As such, the processing circuitry 202 may be embodied as a circuit chip (e.g., an integrated circuit chip) configured (e.g., with hardware, software or a combination of hardware and software) to perform operations described herein.

The processor 206 may be embodied in a number of different ways. For example, the processor 206 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 206 may comprise a plurality of processors. The plurality of processors may be in operative communication with each other and may be collectively configured to perform one or more functionalities of the backup database recovery viability device 104 as described herein.

In some example embodiments, the processor 206 may be configured to execute instructions stored in the memory 204 or otherwise accessible to the processor 206. As such, whether configured by hardware or by a combination of hardware and software, the processor 206 may represent an entity (e.g., physically embodied in circuitry—in the form of processing circuitry 202) capable of performing operations according to embodiments of the present disclosure while configured accordingly. Thus, for example, when the processor 206 is embodied as an ASIC, FPGA or the like, the processor 206 may be specifically configured hardware for conducting the operations described herein. Alternatively, as another example, when the processor 206 is embodied as an executor of software instructions, the instructions may specifically configure the processor 206 to perform one or more operations described herein.

In some example embodiments, the memory 204 may include one or more non-transitory memory devices such as, for example, volatile and/or non-volatile memory that may be either fixed or removable. In this regard, the memory 204 may comprise a non-transitory computer-readable storage medium. It will be appreciated that while the memory 204 is illustrated as a single memory, the memory 204 may comprise a plurality of memories. The memory 204 may be configured to store information, data, applications, instructions and/or the like for enabling the backup database recovery viability device 104 to carry out various functions in accordance with one or more example embodiments. For example, the memory 204 may be configured to buffer input data for processing by the processor 206.

Additionally or alternatively, the memory 204 may be configured to store instructions for execution by the processor 206. As yet another alternative, the memory 204 may include one or more databases that may store a variety of files, contents or data sets. Among the contents of the memory 204, applications may be stored for execution by the processor 206 in order to carry out the functionality associated with each respective application. In some cases, the memory 204 may be in communication with one or more of the processor 206, backup database recovery viability interface 208, communication interface 210, or computer application controller 212 via a bus(es) for passing information among components of the backup database recovery viability device 104.

The backup database recovery viability interface 208 may be in communication with the processing circuitry 202 to receive an indication of an input at the backup database recovery viability interface 208 and/or to provide an audible, visual, mechanical or other output to a user. As such, the backup database recovery viability interface 208 may include, for example, a keyboard, a mouse, a joystick, a display, a touch screen display, a microphone, a speaker, and/or other input/output mechanisms. As such, the backup database recovery viability interface 208 may, in some example embodiments, provide means for a user to assess the recovery viability for the plurality of backup databases 106 in accordance with various example embodiments.

The communication interface 210 may include one or more interface mechanisms for enabling communication with other devices and/or networks. In some cases, the communication interface 210 may be any means such as a device or circuitry embodied in either hardware, or a combination of hardware and software that is configured to receive and/or transmit data from/to a network and/or any other device or module in communication with the processing circuitry 202.

By way of example, the communication interface 210 may be configured to enable the backup database recovery viability device 104 to communicate with the plurality of backup databases 106 and/or the plurality of databases 108. Accordingly, the communication interface 210 may, for example, include an antenna (or multiple antennas) and supporting hardware and/or software for enabling communications with a wireless communication network (e.g., a wireless local area network, cellular network, global positioning system network, and/or the like) and/or a communication modem or other hardware/software for supporting communication via cable, digital subscriber line (DSL), universal serial bus (USB), Ethernet or other methods.

In some example embodiments, the processor 206 (or the processing circuitry 202) may be embodied as, include, or otherwise control a computer application controller 212. As such, the computer application controller 212 may be embodied as various means, such as circuitry, hardware, a computer program product comprising computer readable program instructions stored on a computer readable medium (for example, the memory 204) and executed by a processing device (for example, the processor 206), or some combination thereof.

The computer application controller 212 may be capable of communication with one or more of the memory 204, backup database recovery viability interface 208, or communication interface 210 to access, receive, and/or send data as may be needed to perform one or more of the functionalities of the computer application controller 212 as described herein. In accordance with some example embodiments, the computer application controller 212 may provide means for implementing and controlling functionality of a computer application that may be configured to interact with the plurality of backup databases 106 and/or the plurality of databases 108 to assess the recovery viability of the plurality of backup databases 106 in accordance with various example embodiments.

Having now generally described several embodiments of the backup database recovery viability system 102, assessing the recovery viability of the plurality of backup databases 106 will now be described in accordance with several example embodiments.

Assessing Recovery Viability of Backup Databases

Embodiments herein provide for an example backup database recovery viability system for assessing the recovery viability of backup databases. In some embodiments, the recovery viability of the plurality of backup databases 106 may be assessed by identifying a selected backup database set from the plurality of backup databases 106. In some embodiments, the selected backup database set may include all of the plurality of backup databases 106. For example, in some embodiments, the plurality of backup databases 106 may be a relatively small number of backup databases. As such, it may be practical to assess the recovery viability of each backup database in the plurality of backup databases 106. In other embodiments, the selected backup database set may include a subset of the plurality of backup databases 106.

For example, in some embodiments, the plurality of backup databases 106 may include a relatively large number of backup databases. As such, it may not be practical to assess the recovery viability of each backup database in the plurality of backup databases 106. In some embodiments, the subset of the plurality of backup databases 106 that are selected may be randomly chosen. In some embodiments, the selected backup database set may be selected because it is associated with a corresponding database set of the plurality of databases 108. For example, the corresponding database set of the plurality of databases 108 may include a particular database type. For example, the corresponding database set may include one or more Aurora databases, RDS databases, DynamoDB databases, or S3 databases. Additionally or alternatively, the corresponding database set of the plurality of databases may be a set of databases associated with a particular environment, such as a developer or a production environment. In this regard, the database recovery viability system 102 may be able to assess the recovery viability of backup databases associated with particular types of databases and/or environments.

In some embodiments, the backup database recovery viability device 104 of the backup database recovery viability system 102 may trigger a restore verification operation for each database in the selected backup database set. In some embodiments, the restore verification operation may trigger the creation of a temporary restore database for each database in the selected backup database set. In this regard, the restore verification operation may cause each database in the selected backup database set to be copied to a corresponding temporary restore database. In some embodiments, the restore verification operation may determine whether each temporary restore database is accessible. In some embodiments, a temporary restore database is accessible if the data stored in a corresponding database of the selected backup database set can be read from the temporary restore database. In other words, in some embodiments, the restore verification operation determines whether a database in the selected backup database set has been successfully backed up.

In some embodiments, if a temporary restore database is accessible, the restore verification operation may cause the temporary restore database to be deleted. Alternatively, in some embodiments, if a temporary restore database is not accessible, the restore verification operation may not cause the temporary restore database to be deleted. This may allow a user of the database recovery viability system 102 to investigate why a database in the selected backup database set was not successfully backed up. In some embodiments, the restore verification operation may determine the last time the backup database was backed up (e.g., within the last hour).

In some embodiments the restore verification operation may produce a restore verification status score for each database in the selected backup database set. In some embodiments, the produced restore verification status score for a database in the selected backup database set may be a pass. In some embodiments, a pass score may indicate that a temporary restore database corresponding to the database in the selected backup database set accessible (e.g., the database had been successfully backed up to the backup database such that it can be recovered) and, in some embodiments, that the database has been backed up within a first amount of time (e.g., the database has been backed up within the last hour).

In some embodiments, the produced restore verification status score for a database in the selected backup database set may be a fail. In some embodiments, a fail score may indicate that a temporary restore database corresponding to the database in the selected backup database set is not accessible (e.g., the database had not been successfully backed up). In some embodiments, the produced restore verification status score for a database in the selected backup database set may be an acceptable. In some embodiments, an acceptable score may indicate that a temporary restore database corresponding to the database in the selected backup database set is accessible, but that the database has not been backed up for greater than a first amount of time (e.g., greater than 1 hour).

In some embodiments, the produced restore verification status score for a database in the selected backup database set may be a not applicable. In some embodiments, a not applicable score, may indicate that the temporary restore database corresponding to the database has not finished being created (e.g., the database is still in the processing of being copied to the corresponding temporary restore database).

In some embodiments, the backup database recovery viability device 104 of the backup database recovery viability system 102 may assess the configuration settings of each database in the corresponding database set of the plurality of databases 108. In this regard, the backup database recovery viability device 104 may trigger a backup configuration check operation for each database in the corresponding database set. In some embodiments, the backup configuration check operation may include extracting metadata for each database in the corresponding database set.

In some embodiments, the extracted metadata may be used to generate a database configuration metadata structure comprising a plurality of configuration records each representative of one or more configuration settings for a respective database in the corresponding database set. In some embodiments, the configuration records may comprise a configuration value for each of the one or more configuration settings. In some embodiments, the database configuration metadata structure may be parsed to identify whether each of the configuration values for each of the one or more configuration settings meets a respective pre-defined configuration value.

In some embodiments, the backup configuration check operation may produce a backup configuration check score for each database in the corresponding database set. In some embodiments, the backup configuration check score for a database in the corresponding database set may be a pass. In some embodiments, a pass score may indicate that the configuration settings of a database in the corresponding database set match the pre-defined configuration. In some embodiments, the backup configuration check score for a database in the corresponding database set may be a fail. In some embodiments, a fail score may indicate that the configuration settings of a database in the corresponding database set do not match the pre-defined configuration. In some embodiments, the backup configuration check score for a database in the corresponding database set may be not applicable. In some embodiments, a not applicable score may indicate that the backup configuration check operation was unable to extract metadata of a database in the corresponding database set.

In some embodiments, the backup configuration check operation may be selected from a plurality of backup configuration check operations based on the database type of the corresponding database set of the plurality of databases 108. In some embodiments, each database type may have different configuration settings. As such, in some embodiments, each backup configuration check operation in the plurality of backup configuration check operations may be configured to assess the configuration settings of a particular database type.

As an example, a first backup configuration check operation in the plurality of backup configuration check operations may be associated with a first database type (e.g., Aurora). In this regard, the first backup configuration check operation may extract metadata for each database in a set of databases of the first database type to generate a database configuration metadata structure. The database configuration metadata structure may include a plurality of configuration records each representative of one or more configuration settings for a respective database of the first database type with each configuration record comprising a configuration value for each of the one or more configuration settings. For example, the configuration record of a database of the first database type may include a backup configuration setting. As another example, the configuration record of a database of the first database type may include an hourly snapshots configuration setting (e.g., the Aurora database is configured to be backed up every hour).

The configuration record of each database of the first database type may include a configuration value for each of the configuration settings of the database. The configuration value for each of the configuration settings of a database of the first database type may be true or false. For example, the configuration record of a database of the first database type may indicate that the database has a backup configuration setting and the configuration value associated with the backup configuration setting may be true or false. If the configuration value is true for the backup configuration setting this indicates that the backup configuration setting is turned on (e.g., the Aurora database is configured to be backed up). If the configuration value is false for the backup configuration setting this indicates that the backup configuration setting has not been turned on (e.g., the Aurora database is not configured to be backed up).

In some embodiments, the first backup configuration check operation may identify whether each of the configuration values for each of the one or more configuration settings of the database meets a respective pre-defined configuration value. In some embodiments, the pre-defined configuration value may be set by the backup database recovery viability system 102 to be true or false. In some embodiments, each of the configuration values for each of the one or more configuration settings of the database meet the pre-defined configuration value if each of the configuration values is true. In some embodiments, if each of the configuration values meets the pre-defined configuration value, the backup configuration check score produced by the first backup configuration check operation will be a pass score. In some embodiments, if one or more of the configuration values does not meet the pre-defined configuration value, the backup configuration check score produced by the first backup configuration check operation will be a fail score.

As another example, a second backup configuration check operation in the plurality of backup configuration check operations may be associated with a second database type (e.g., RDS). In this regard, the second backup configuration check operation may extract metadata for each database in a set of databases of the second database type to generate a database configuration metadata structure. The database configuration metadata structure may include a plurality of configuration records each representative of one or more configuration settings for a respective database second database type with each configuration record comprising a configuration value for each of the one or more configuration settings. For example, the configuration record of a database of the second database type may include a backup configuration setting. As another example, the configuration of a database of the second database type may include a continuous backup configuration setting (e.g., the RDS database is configured to be backed up every time a change is made to the RDS database).

The configuration record of each database of the second database type may include a configuration value for each of the configuration settings of the database. The configuration value for each of the configuration settings of a database of the second database type may be true or false. For example, the configuration record of a database may indicate that the database has a continuous backup configuration setting and the configuration value associated with the backup configuration setting may be true or false. If the configuration value is true for the continuous backup configuration setting this indicates that the continuous backup configuration setting is turned on (e.g., the RDS database is configured to be continuously backed up). If the configuration value is false for the continuous backup configuration setting this indicates that the continuous backup configuration setting has not been turned on (e.g., the RDS database is not configured to be continuously backed up).

In some embodiments, the second backup configuration check operation may identify whether each of the configuration values for each of the one or more configuration settings of the database meets a respective pre-defined configuration value. In some embodiments, the pre-defined configuration value may be set by the backup database recovery viability system 102 to be true or false. In some embodiments, each of the configuration values for each of the one or more configuration settings of the database meet the pre-defined configuration value if each of the configuration values is true. In some embodiments, if each of the configuration values meets the pre-defined configuration value, the backup configuration check score produced by the second backup configuration check operation will be a pass score. In some embodiments, if one or more of the configuration values does not meet the pre-defined configuration value, the backup configuration check score produced by the second backup configuration check operation will be a fail score.

As another example, a third backup configuration check operation in the plurality of backup configuration check operations may be associated with a third database type (e.g., DynamoDB). In this regard, the third backup configuration check operation may extract metadata for each database in a set of databases of the third database type to generate a database configuration metadata structure. The database configuration metadata structure may include a plurality of configuration records each representative of one or more configuration settings for a respective database of the third database type with each configuration record comprising a configuration value for each of the one or more configuration settings. For example, the configuration record of a database may include a continuous backup configuration setting. As another example, the configuration of a database of the third database type may include a point in time recovery configuration setting (e.g., the DynamoDB database can be recovered in the state it existed at any previous point in time).

The configuration record of each database of the third database type may include a configuration value for each of the configuration settings of the database. The configuration value for each of the configuration settings of a database may be true or false. For example, the configuration record of a database may indicate that the database has a point in time recovery configuration setting and the configuration value associated with the point in time recovery configuration setting may be true or false. If the configuration value is true for the point in time recovery configuration setting this indicates that the point in time recovery backup configuration setting is turned on (e.g., the DynamoDB database is configured such that the database can be recovered in the state it existed at any previous point in time). If the configuration value is false for the point in time recovery configuration setting this indicates that the point in time recovery configuration setting has not been turned on (e.g., the DynamoDB database is configured such that the database cannot be recovered in the state it existed at any previous point in time).

In some embodiments, the third backup configuration check operation may identify whether each of the configuration values for each of the one or more configuration settings of the database of the third database type meets a respective pre-defined configuration value. In some embodiments, the pre-defined configuration value may be set by the backup database recovery viability system 102 to be true or false. In some embodiments, each of the configuration values for each of the one or more configuration settings of the database meet the pre-defined configuration value if each of the configuration values is true. In some embodiments, if each of the configuration values meets the pre-defined configuration value, the backup configuration check score produced by the third backup configuration check operation will be a pass score. In some embodiments, if one or more of the configuration values does not meet the pre-defined configuration value, the backup configuration check score produced by the third backup configuration check operation will be a fail score.

As another example, a fourth backup configuration check in the plurality of backup configuration check operations may be associated with a fourth database type (e.g., S3). In this regard, the fourth backup configuration check operation may extract metadata for each database in a set of databases of the fourth database type to generate a database configuration metadata structure. The database configuration metadata structure may include a plurality of configuration records each representative of one or more configuration settings for a respective database of the fourth database type with each configuration record comprising a configuration value for each of the one or more configuration settings. For example, the configuration record of a database of the fourth database type may include a backup configuration setting.

As another example, the configuration of a database of the fourth database type may include a backup versioning configuration setting (e.g., each version of the source database is configured to be accessible). As another example, the configuration record of a database of the fourth database type may include a vault backup configuration setting (e.g., the database is configured to be backed up to another database, such as a vault database, in the plurality of databases 108). As another example, the configuration of a database may include a vault backup versioning configuration setting (e.g., each version of the vault database is configured to be accessible). As another example, the configuration record of a database may include a vault expiration configuration setting (e.g., the vault database is configured to expire after a certain time period, such as 30 days).

The configuration record of each database of the fourth database type may include a configuration value for each of the configuration settings of the database. The configuration value for each of the configuration settings of a database may be true or false. For example, the configuration record of a database may indicate that the database has a continuous backup configuration setting and the configuration value associated with the backup configuration setting may be true or false. If the configuration value is true for the continuous backup configuration setting this indicates that the continuous backup configuration setting is turned on (e.g., the S3 database is configured to be continuously backed up). If the configuration value is false for the continuous backup configuration setting this indicates that the continuous backup configuration setting has not been turned on (e.g., the S3 database is not configured to be continuously backed up).

In some embodiments, the fourth backup configuration check operation may identify whether each of the configuration values for each of the one or more configuration settings of the database meets a respective pre-defined configuration value. In some embodiments, the pre-defined configuration value may be set by the backup database recovery viability system 102 to be true or false. In some embodiments, each of the configuration values for each of the one or more configuration settings of the database meet the pre-defined configuration value if each of the configuration values is true. In some embodiments, if each of the configuration values meets the pre-defined configuration value, the backup configuration check score produced by the fourth backup configuration check operation will be a pass score. In some embodiments, if one or more of the configuration values does not meet the pre-defined configuration value, the fourth backup configuration check score produced by the backup configuration check operation will be a fail score.

In some embodiments, the backup database recovery viability device 104 of the backup database recovery viability system 102 may produce a recovery point objective score for each database in the selected backup database set. The recovery point object score may be based on the restore verification operation and the backup configuration check operation. In this way, the selected backup database set may a combination of the restore verification status score produced by the restore verification operation and the backup configuration check score produced by the backup configuration check operation.

In some embodiments, the recovery point objective score for a database in the selected backup database set may be a pass. In some embodiments, a pass score may indicate that the both the restore verification status score and the backup configuration check score were a pass. In some embodiments, the recovery point objective score for a database in the selected backup database set may be a fail. In some embodiments, a fail score may indicate that the either or both of the restore verification status score and the backup configuration check score were a fail. In some embodiments, the recovery point objective score for a database in the selected backup database set may be warning. In some embodiments, a warning score may indicate that the restore verification status score for a database in the selected backup database was a pass, but the backup configuration check score for a database in the corresponding database set was not applicable. In some embodiments, the recovery point objective score for a database in the selected backup database set may be an acceptable. In some embodiments, an acceptable score may indicate that the restore verification status score for a database in the selected backup database was an acceptable and the backup configuration check score for a database in the corresponding database set was a pass.

Figure 3:
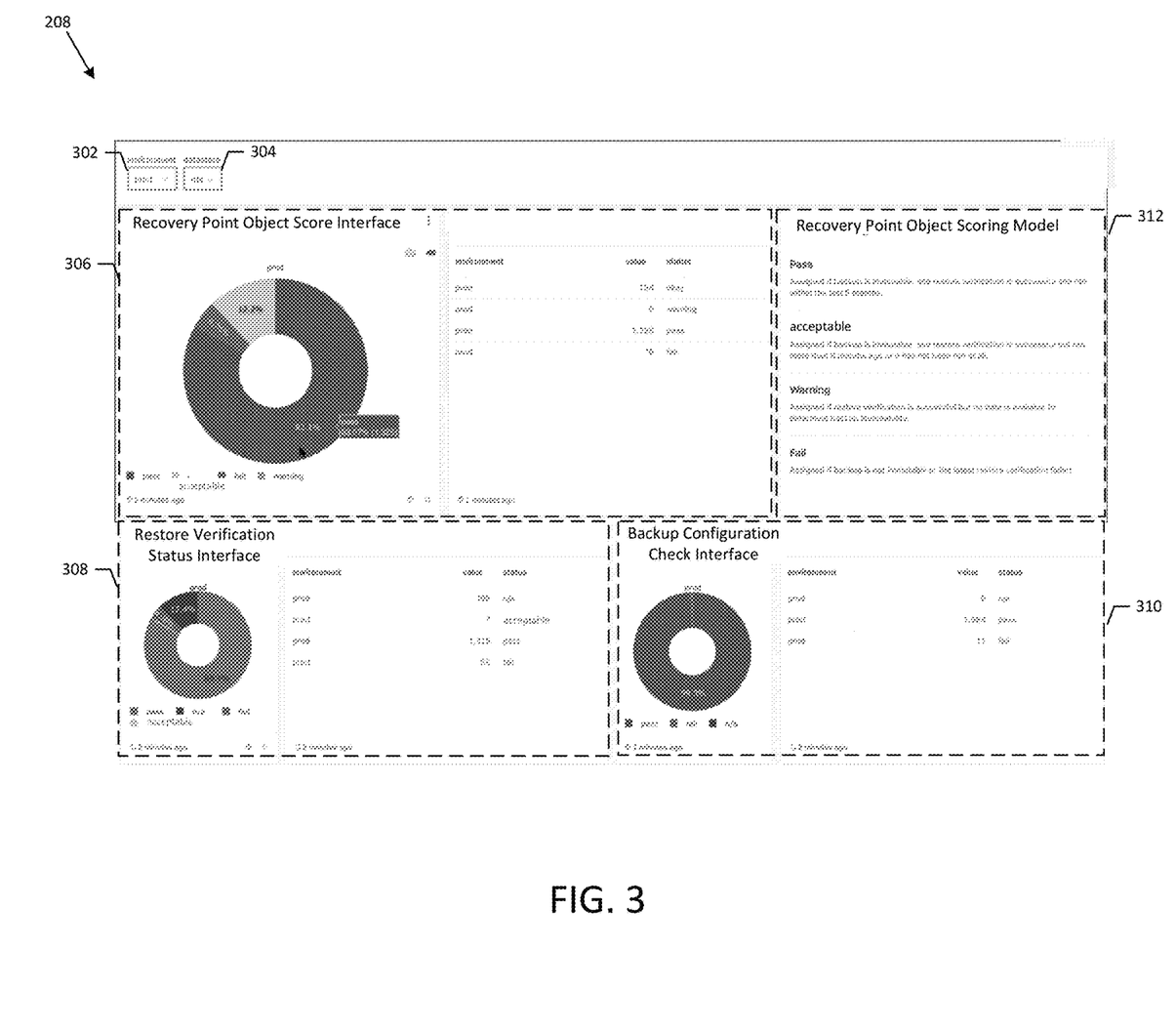
FIG. 3 illustrates a backup database recovery viability interface in accordance with one or more embodiments of the present disclosure.

In some embodiments, the backup database recovery viability device 104 of the backup database recovery viability system 102 may be configured to generate a recovery point objective score interface 306. In some embodiments, generating the recovery point objective score interface 306 may be based on the recovery point objective score for each database in the selected backup database set. In some embodiments, in response to receiving an input selection from a user, the backup database recovery viability device 104 of the backup database recovery viability system 102 may be configured to cause rendering of the recovery point objective score interface 306 on the backup database recovery viability interface 208. In some embodiments, the recovery point objective score interface 306 may include charts, graphs, text, and/or the like that indicate the number and/or percentage of databases in the selected backup database set with a recovery point objective score of pass, fail, warning, and/or acceptable.

In some embodiments, the backup database recovery viability device 104 of the backup database recovery viability system 102 may be configured to generate a restore verification status interface 308. In some embodiments, generating of the restore verification status interface 308 may be based on the restore verification status score for each database in the selected backup database set. In some embodiments, in response to receive an input selection from a user, the backup database recovery viability device 104 of the backup database recovery viability system 102 may be configured to cause rendering of the restore verification status interface 308 on the backup database recovery viability interface 208. In some embodiments, the restore verification status interface 308 may include charts, graphs, text and/or the like that indicate the number and/or percentage of databases in the selected backup database set with a restore verification status score of pass, fail, not applicable, and/or acceptable.

In some embodiments, the backup database recovery viability device 104 of the backup database recovery viability system 102 may be configured to generate a backup configuration check interface 310. In some embodiments, the backup configuration check interface 310 may be based on the backup configuration check score for each database in the corresponding database set. In some embodiments, in response to receiving an input selection from a user, backup database recovery viability device 104 of the backup database recovery viability system 102 may be configured to cause rendering of the backup configuration check interface 310 on the backup database recovery viability interface 208. In some embodiments, the backup configuration check interface 310 may include charts, graphs, text, and/or the like that indicate the number and/or percentage of databases in the selected backup database set with a backup configuration check score of pass, fail, and/or not applicable.

In some embodiments, a user of the backup database recovery viability device 104 may be able to view the backup configuration check interface 310 for various selected backup database sets for different environments. For example, in some embodiments, a user of the backup database recovery viability device 104 may be able view a selected backup database set for a particular environment by selecting a first tab 302 on the backup database recovery viability interface 208. As another example, in some embodiments, a user of the backup database recovery viability device 104, may be able view a selected backup database set for a particular type of database by using a second tab 304 on the backup database recovery viability interface 208.

Example Method

Figure 4:
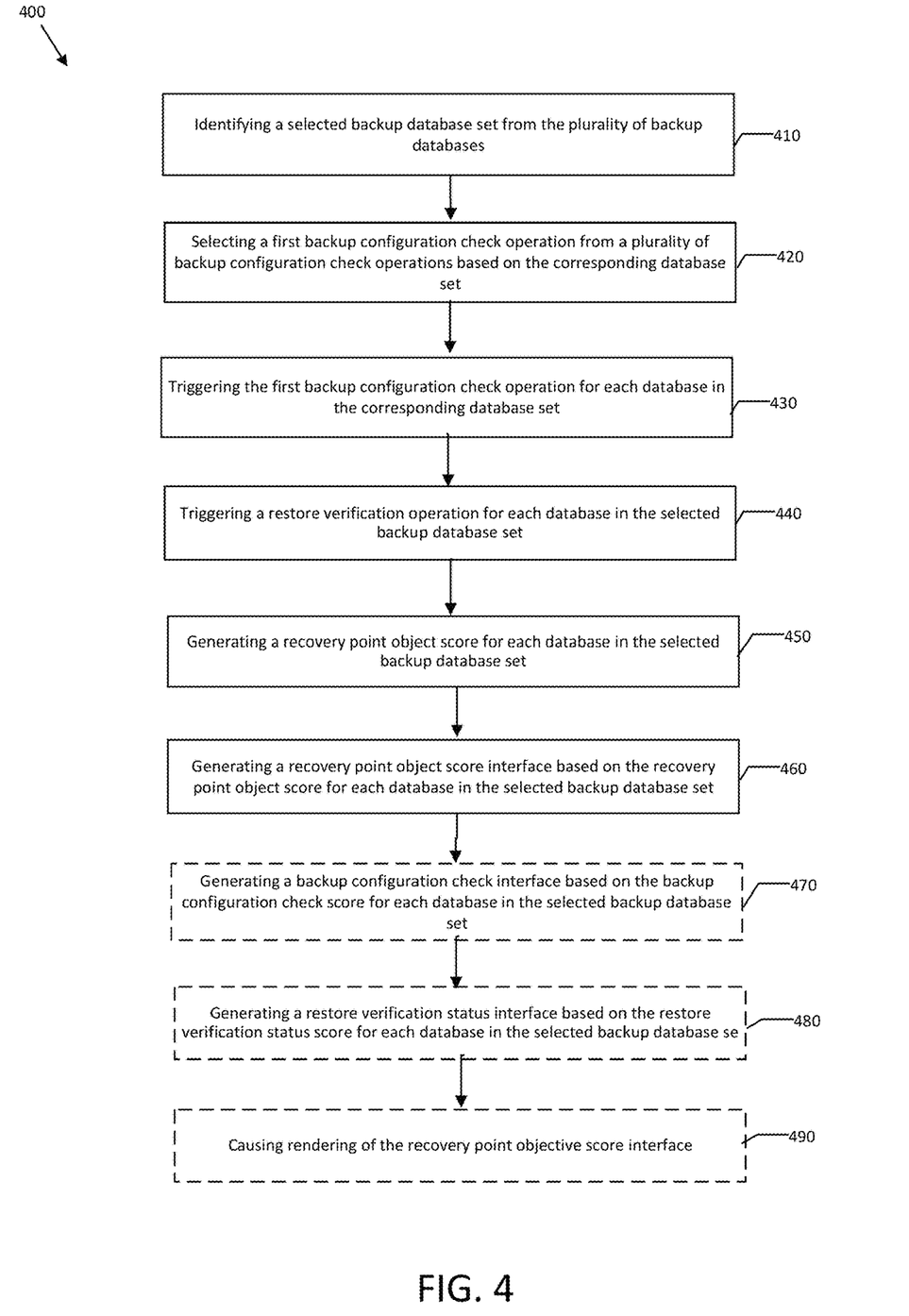
FIG. 4 illustrates a flowchart for assessing the recovery viability of backup databases in accordance with one or more embodiments of the present disclosure.

Referring now to FIG. 4, an example method 400 for assessing recovery viability for a plurality of backup databases is provided. As shown in block 410, the method begins with identifying a selected backup database set from the plurality of backup databases. In some example implementations, each backup database in the selected backup database set is associated with a database in a corresponding database set. As shown in block 420, the method continues with selecting a first backup configuration check operation from a plurality of backup configuration check operations based on the corresponding database set. As shown in block 430, the method continues with triggering a first backup configuration check operation for each database in the corresponding database set. As shown in block 440, the method continues with triggering a restore verification operation for each database in the selected backup database set. As shown in block 450, the method continues with generating a recovery point objective score for each database in the selected backup database set.

In some example implementations, the recovery point objective score is determined based on the first backup configuration check operation and the restore verification operation. As shown in block 460, the method continues with generating a recovery point objective score interface based on the recovery point objective score for each database in the selected backup database set. In some example implementations, the backup configuration check operation produces a backup configuration check score for each database in the selected backup database set. At block 470, the method may optionally include generating a backup configuration check interface based on the first backup configuration check score for each database in the corresponding database set. In some example implementations, the restore verification operation produces a restore verification status score for each database in the selected backup database set. At block 480, the method may optionally include generating a restore verification status interface based on the restore verification status score for each database in the selected backup database set. At block 490, the method may optionally include causing rendering of the recovery point objective score interface.

Example Data Flows

Figure 5:
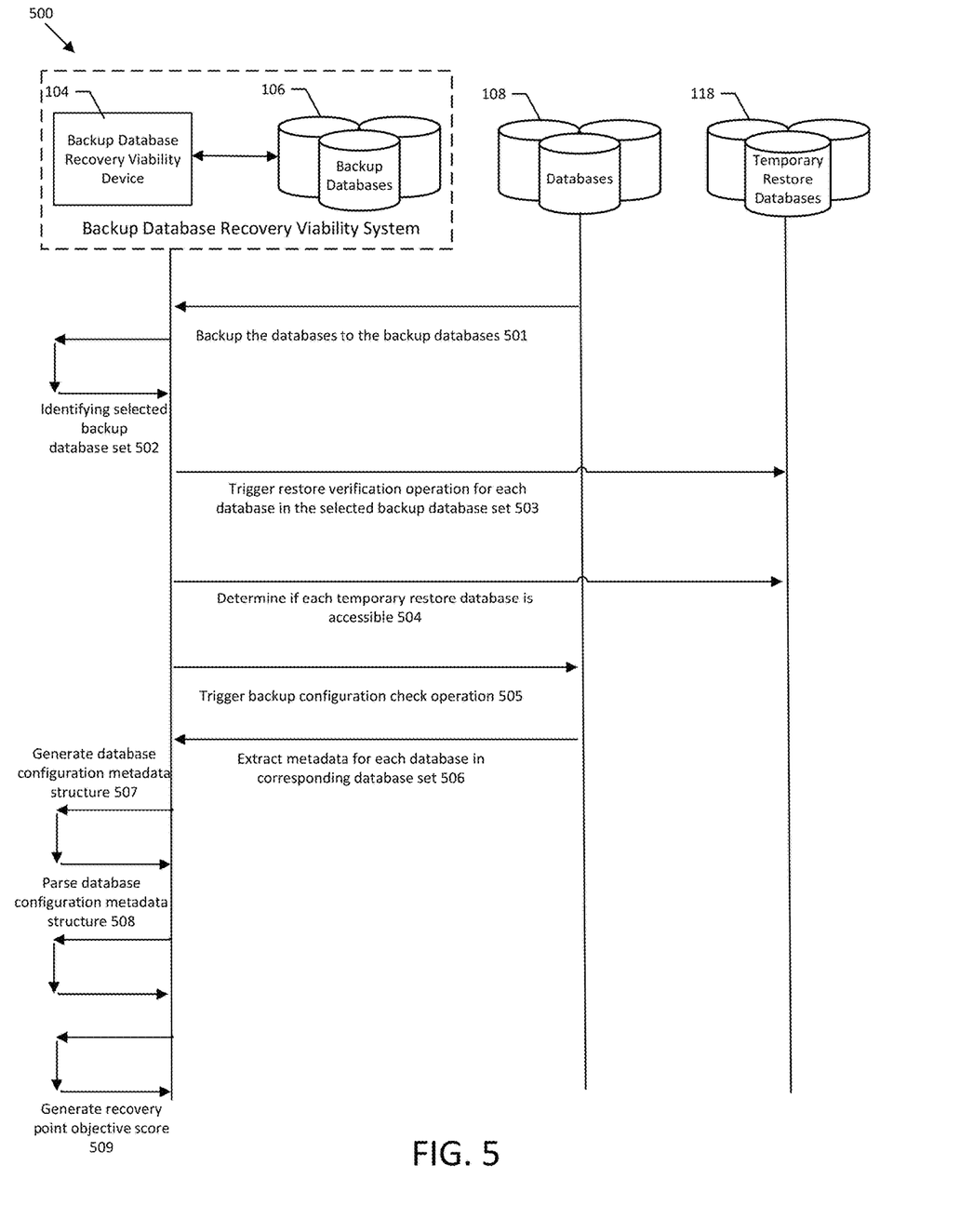
FIG. 5 illustrates example communication flow associated with example assessing recovery viability of backup databases, in accordance with embodiments of the present disclosure.

Referring now to FIG. 5, data flow associated with assessing recovery viability of backup databases is provided. In some embodiments, the plurality of databases 108 may be backed up to the plurality of backup databases 106 at 501. In some embodiments, the backup database recovery viability system 102 may identifying a selected backup database set in which each backup database in the selected backup database set is associated with a database in a corresponding database set at 502. In some embodiments, the backup database recovery viability system 102 may trigger the restore verification operation for each database in the selected backup database set at 503. In some embodiments, the backup database recovery viability system 102 may determine if each temporary restore database is accessible at 504.

In some embodiments, the backup database recovery viability system 102 may trigger the backup configuration check operation at 505. In some embodiments, the backup database recovery viability system 102 may extract metadata for each database in the corresponding database set of the plurality of databases 108 at 506. In some embodiments, the backup database recovery viability system 102 may generate a database configuration metadata structure at 507. In some embodiments, the backup database recovery viability system 102 may parse the database configuration structure at 508. In some embodiments, the backup database recovery viability system 102 may generate a recovery point object score at 509.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a descriptive sense and not for purposes of limitation.

The invention claimed is:

1. An apparatus configured for assessing recovery viability for a selected backup database, the apparatus comprising at least a processor, and a memory associated with the processor having computer coded instructions therein, with the computer coded instructions configured to, when executed by the processor, cause the apparatus to:
   select a backup configuration check operation based at least in part on a database corresponding to a selected backup database;
   trigger the backup configuration check operation for the database;
   trigger a restore verification operation for the selected backup database; and
   generate a recovery point objective score for the selected backup database, wherein the recovery point objective score is determined based at least in part on the backup configuration check operation and the restore verification operation.

2. The apparatus of claim 1, wherein the restore verification operation comprises:
   triggering generation of a temporary restore database based at least in part on the selected backup database.

3. The apparatus of claim 2, wherein the restore verification operation further comprises:
   determining if the temporary restore database is accessible, wherein determining if the temporary restore database is accessible comprises determining if data associated with the selected backup database can be read from the temporary restore database.

4. The apparatus of claim 3, wherein, in an instance in which the data associated with the selected backup database can be read from the temporary restore database, the restore verification operation further comprises:
   triggering deletion of the temporary restore database.

5. The apparatus of claim 1, wherein the computer coded instructions are configured to, when executed by the processor, further cause the apparatus to:
   generate a backup configuration check score for the database based at least in part on the backup configuration check operations; and
   generate a restore verification status score for the selected backup database based at least in part on the restore verification operation.

6. The apparatus of claim 5, wherein, in an instance in which the backup configuration check score is associated with a pass score and the restore verification status score is associated with a pass score, the recovery point objective score is associated with a pass score.

7. The apparatus of claim 5, wherein, in an instance in which the backup configuration check score is associated with a fail score or the restore verification status score is associated with a fail score, the recovery point objective score is associated with a fail score.

8. The apparatus of claim 5, wherein, in an instance in which the backup configuration check score is associated with a not applicable score and the restore verification status score is associated with a pass score, the recovery point objective score is associated with a warning score.

9. The apparatus of claim 5, wherein, in an instance in which the backup configuration check score is associated with a pass score and the restore verification status score is associated with an acceptable score, the recovery point objective score is associated with an acceptable score.

10. The apparatus of claim 5, wherein the computer coded instructions are configured to, when executed by the processor, further cause the apparatus to:
    generate a recovery point objective score interface based at least in part on the recovery point objective score for the selected backup database, a restore verification status interface based at least in part on the restore verification status score for the selected backup database, or a backup configuration check interface based at least in part on the backup configuration check score for the database.

11. A method for assessing recovery viability for a selected backup database, the method comprising:
    selecting a backup configuration check operation based at least in part on a database corresponding to a selected backup database;
    triggering the backup configuration check operation for the database;
    triggering a restore verification operation for the selected backup database; and
    generating a recovery point objective score for the selected backup database, wherein the recovery point objective score is determined based at least in part on the backup configuration check operation and the restore verification operation.

12. The method of claim 11, wherein the restore verification operation comprises:
triggering generation of a temporary restore database based at least in part on the selected backup database.

13. The method of claim 12, wherein the restore verification operation further comprises:
determining if the temporary restore database is accessible, wherein determining if the temporary restore database is accessible comprises determining if data associated with the selected backup database can be read from the temporary restore database.

14. The method of claim 13, wherein, in an instance in which the data associated with the selected backup database can be read from the temporary restore database, the restore verification operation further comprises:
triggering deletion of the temporary restore database.

15. The method of claim 11, further comprising:
generate a backup configuration check score for the database based at least in part on the backup configuration check operations; and
generate a restore verification status score for the selected backup database based at least in part on the restore verification operation.

16. The method of claim 15, wherein, in an instance in which the backup configuration check score is associated with a pass score and the restore verification status score is associated with a pass score, the recovery point objective score is associated with a pass score.

17. The method of claim 15, wherein, in an instance in which the backup configuration check score is associated with a fail score or the restore verification status score is associated with a fail score, the recovery point objective score is associated with a fail score.

18. The method of claim 15, wherein, in an instance in which the backup configuration check score is associated with a not applicable score and the restore verification status score is associated with a pass score, the recovery point objective score is associated with a warning score.

19. The method of claim 15, wherein, in an instance in which the backup configuration check score is associated with a pass score and the restore verification status score is associated with an acceptable score, the recovery point objective score is associated with an acceptable score.

20. A computer program product for assessing recovery viability for a selected backup database, the computer program product comprising at least one non-transitory computer readable storage medium having computer executable code portions stored therein, the computer executable code portions comprising program code instructions configured to:
select a backup configuration check operation based at least in part on a database corresponding to a selected backup database;
trigger the backup configuration check operation for the database;
trigger a restore verification operation for the selected backup database; and
generate a recovery point objective score for the selected backup database, wherein the recovery point objective score is determined based at least in part on the backup configuration check operation and the restore verification operation.

* * * * *